United States Patent
Kim et al.

(10) Patent No.: US 7,493,986 B2
(45) Date of Patent: Feb. 24, 2009

(54) ELECTRIC POWER STEERING APPARATUS FOR AUTOMOBILE

(75) Inventors: Seongjoo Kim, Seongam (KR);
Joonkyu Song, Seongnam (KR);
Taebong Noh, Gunpo-si (KR);
Byoungkuk Kim, Gangnam-gu (KR)

(73) Assignee: Mando Corporation, Pyeongtaek-si (KR)

( * ) Notice: Subject to any disclaimer, the term of this patent is extended or adjusted under 35 U.S.C. 154(b) by 425 days.

(21) Appl. No.: 11/363,382

(22) Filed: Feb. 27, 2006

(65) Prior Publication Data

US 2007/0062754 A1    Mar. 22, 2007

(30) Foreign Application Priority Data

Sep. 20, 2005  (KR) .............. 10-2005-0087470

(51) Int. Cl.
*B62D 5/04* (2006.01)
*B62D 5/06* (2006.01)

(52) U.S. Cl. ...................... 180/444; 180/428
(58) Field of Classification Search ............. 180/443, 180/444, 446, 428; 74/425
See application file for complete search history.

(56) References Cited

U.S. PATENT DOCUMENTS

| | | | | |
|---|---|---|---|---|
| 6,357,313 B1 * | 3/2002 | Appleyard | ............... | 74/388 PS |
| 6,491,131 B1 * | 12/2002 | Appleyard | ................. | 180/444 |
| 6,763,738 B1 * | 7/2004 | Tsutsui et al. | ............ | 74/388 PS |
| 6,769,507 B2 * | 8/2004 | Murakami et al. | .......... | 180/444 |
| 7,188,700 B2 * | 3/2007 | Eda et al. | .................... | 180/444 |

| | | |
|---|---|---|
| 2003/0127277 A1 | 7/2003 | Murakami et al. |
| 2004/0045386 A1 | 3/2004 | Saruwatari et al. |
| 2004/0089049 A1 | 5/2004 | Kurita et al. |
| 2004/0163879 A1 | 8/2004 | Segawa |

FOREIGN PATENT DOCUMENTS

| | | |
|---|---|---|
| EP | 1335154 B1 | 8/2003 |
| EP | 1571067 A1 | 9/2005 |
| EP | 1571356 A1 | 9/2005 |
| JP | 2001-145082 | 5/2002 |
| JP | 2005-104366 | 4/2005 |
| WO | WO-99/65758 A1 | 12/1999 |

OTHER PUBLICATIONS

European Search Report for Application No. 06250896.5-1523, dated Jan. 24, 2007.

\* cited by examiner

*Primary Examiner*—Paul N Dickson
*Assistant Examiner*—Marc A Scharich
(74) *Attorney, Agent, or Firm*—Lahive & Cockfield, LLP; EuiHoon Lee

(57) ABSTRACT

An electric power steering apparatus for an automobile includes a reduction mechanism having a worm shaft and a worm wheel, the worm shaft having a worm formed on an outer peripheral surface of the worm shaft, the worm shaft being contained in a housing, the worm wheel being formed on a side of the steering shaft, the reduction mechanism being driven by the motor; a support member for enclosing an end-side outer peripheral surface of the worm shaft; and an elastic member for applying elastic force to the support member in a direction slanted away from an axial direction of the worm shaft. The gap between the worm wheel and the worm shaft is compensated for and backlash is avoided. Since a single elastic member is used, the number of components is reduced, the manufacturing process is simplified, and the manufacturing cost is reduced.

5 Claims, 4 Drawing Sheets

ELECTRIC POWER STEERING APPARATUS FOR AUTOMOBILE

RELATED APPLICATION

This application claims convention priority to Korean patent appln. No. 2005-87470 filed on Sep. 20, 2005, the content of which is incorporated by reference.

BACKGROUND OF THE INVENTION

1. Field of the Invention

The present invention relates to an electric power steering apparatus for an automobile. More particularly, the present invention relates to an electric power steering apparatus for an automobile having a support member and an elastic member for applying elastic force in the axial and radial directions of a worm shaft so that the gap between a worm wheel and the worm shaft is compensated for and backlash is avoided.

2. Description of the Prior Art

As generally known in the art, power steering apparatuses for automobiles include a hydraulic power steering apparatus utilizing hydraulic pressure of a hydraulic pump, which has been used since its initial introduction, and an electric power steering apparatus utilizing an electric motor, use of which has been gradually universalized since the 1990's.

In the existing hydraulic power steering apparatus, a hydraulic pump, which is a power source for supplying steering power, is driven by an engine, which causes the hydraulic pump to continuously consume energy regardless of whether or not the steering wheel is being rotated. In the electric power steering apparatus, when steering torque is generated by rotation of a steering wheel, a motor supplies steering power in proportion to the generated steering torque. Therefore, in terms of energy efficiency, the electric power steering apparatus is more advantageous than the hydraulic power steering apparatus.

FIG. 1 shows the construction of a conventional electric power steering apparatus for an automobile, and FIG. 2 is a sectional view showing a reduction mechanism according to the prior art.

As shown in FIGS. 1 and 2, a conventional electric power steering apparatus includes a steering system 100, which includes elements leading from a steering wheel 101 to both wheels 108, and a steering power mechanism 120 for supplying steering power to the steering system 100.

The steering system 100 includes a steering shaft 102 having an upper end connected to the steering wheel 101 and a lower end connected to a pinion shaft 104 via a pair of universal joints 103, so that the steering shaft 102 rotates together with the steering wheel 101. The pinion shaft 104 is connected to a rack bar 109 via a rack-pinion mechanism 105. Both ends of the rack bar 109 are connected to the wheels 108 of the automobile via tie rods 106 and knuckle arms 107.

The rack-pinion mechanism 105 includes a pinion gear 111 formed on the lower end of the pinion shaft 104 and a rack gear 112 formed on one side of the outer peripheral surface of the rack bar 109 to engage with the pinion gear 111. The rack-pinion mechanism 105 converts the rotational motion of the pinion shaft 104 into a linear motion of the rack bar 109. Particularly, when the driver operates the steering wheel 101, the pinion shaft 104 rotates accordingly. The rotation of the pinion shaft 104 causes the rack bar 109 to move linearly in the shaft direction. The linear motion of the rack bar 109 is transmitted to and thereby operates the wheels 108 via the tie rods 106 and the knuckle arms 107.

The steering power mechanism 120 includes a torque sensor 121 for sensing steering torque applied to the steering wheel 101 by the driver and outputting an electric signal in proportion to the sensed steering torque, an ECU (electronic control unit) 123 for generating a control signal based on the electric signal from the torque sensor 121, a motor 130 for generating steering power based on the control signal from the ECU 123, and a reduction mechanism 140 having a worm 201 and a worm wheel 203 for transmitting the steering power from the motor 130 to the steering shaft 102.

The reduction mechanism 140 includes a worm shaft 210, both ends of which are rotatably supported by bearings 205 and 206, respectively. The worm 201 is positioned on one side of the outer peripheral surface of the worm shaft 210. The worm 201 is adapted to engage with the worm wheel 203, which is formed in a predetermined position on the outer peripheral surface of the steering shaft 102. The worm shaft 210 is driven by the motor 130.

The electric power steering apparatus is operated as follows: when the driving wheel 101 is rotated, driving torque is generated and transmitted to the rack bar 109 via the rack-pinion mechanism 105. In addition, the generated steering torque causes the motor 130 to generate steering power, which is transmitted to the rack bar 109. As such, the steering torque generated by the steering system 100 is combined with the steering power generated by the motor 130, so that the rack bar 109 is moved in the shaft direction.

However, conventional reduction mechanisms have a problem in that, as the automobile is operated and steered over a period of time, the teeth of the worm 201 and worm wheel 203 may be worn down. In addition, the worm wheel 203 may contract in the winter season, because it is made of a synthetic resin in most cases.

When the teeth of the worm 201 or the worm wheel 203 wear down or when the worm wheel 203 contracts, a gap is generated between the teeth of the worm 201 and the teeth of the worm wheels 203. As a result, backlash occurs in the region where the teeth of the worm 201 engage with the teeth of the worm wheel 203.

In addition, when conventional reduction mechanisms are subjected to inverse pressure, which is caused by kickback, for example, and resulting excessive torque, gapped portions of bearings on both ends of the worm shaft 210 may generate noise.

In an attempt to solve these problems, two elastic bodies are inserted, according to the prior art, in such a manner that elastic force is applied in the radial and axial directions of the worm shaft, respectively. However, this approach increases the number of components and lengthens the manufacturing process.

SUMMARY OF THE INVENTION

Accordingly, the present invention has been made to solve the above-mentioned problems occurring in the prior art, and an object of the present invention is to provide an electric power steering apparatus for an automobile having a support member and an elastic member for simultaneously applying elastic force in the axial and radial directions of a worm shaft so that the gap between a worm wheel and the worm shaft is compensated for and backlash is avoided.

Another object of the present invention is to provide an electric power steering apparatus for an automobile having a single elastic member for applying elastic force to a worm shaft, in order to reduce the number of components, simplify the manufacturing process, and reduce the manufacturing cost.

In order to accomplish these objects, there is provided an electric power steering apparatus for an automobile including a steering shaft connected to a steering wheel of the automobile; a pinion shaft having an upper end connected to the steering shaft; a torque sensor for sensing torque generated by rotation of the steering shaft; an electronic control unit adapted to receive an electrical signal from the torque sensor; a motor, driving of the motor being controlled by the electronic control unit; a reduction mechanism having a worm shaft and a worm wheel, the worm shaft having a worm formed on an outer peripheral surface of the worm shaft, the worm shaft being contained in a housing, the worm wheel being formed on a side of the steering shaft, the reduction mechanism being driven by the motor; a support member for enclosing an end-side outer peripheral surface of the worm shaft; and an elastic member for applying elastic force to the support member in a direction slanted away from an axial direction of the worm shaft.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
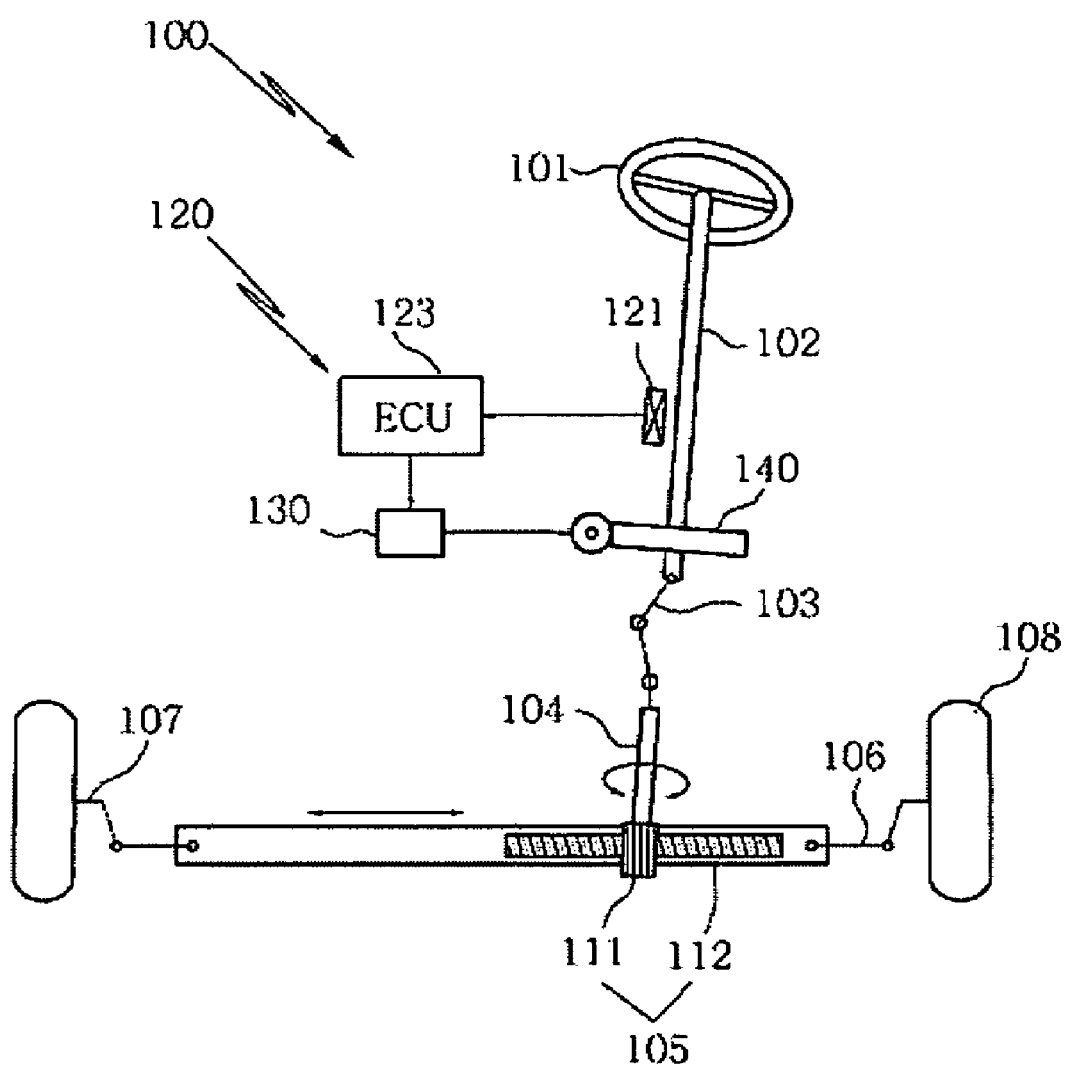
FIG. 1 shows the construction of a conventional electric power steering apparatus for an automobile.
Figure 2:
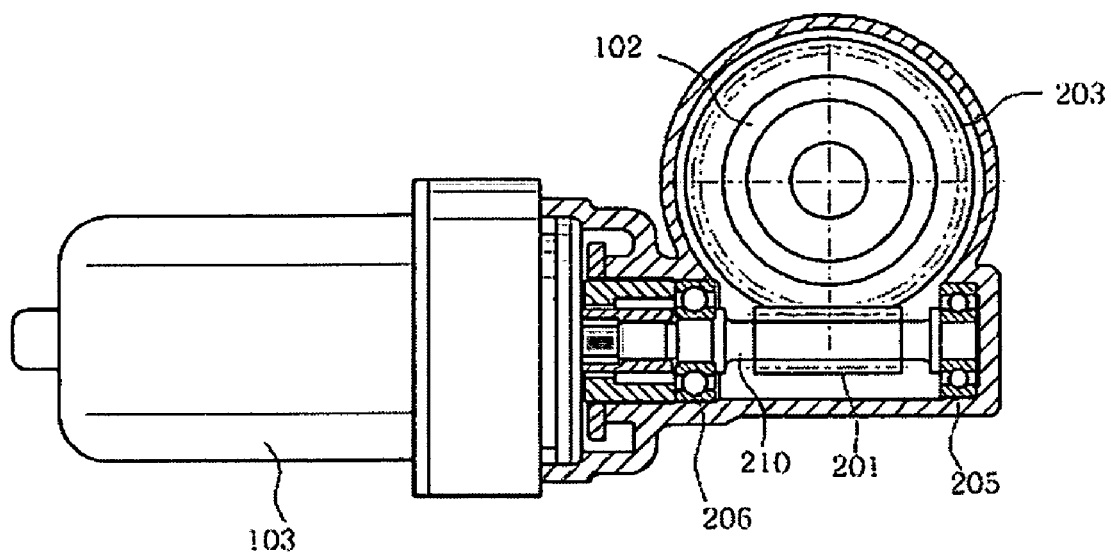
FIG. 2 is a sectional view showing a reduction mechanism according to the prior art.

Hereinafter, a preferred embodiment of the present invention will be described with reference to the accompanying drawings. In the following description and drawings, the same reference numerals are used to designate the same or similar components, so repetition of the description on the same or similar components will be omitted.

Figure 3:
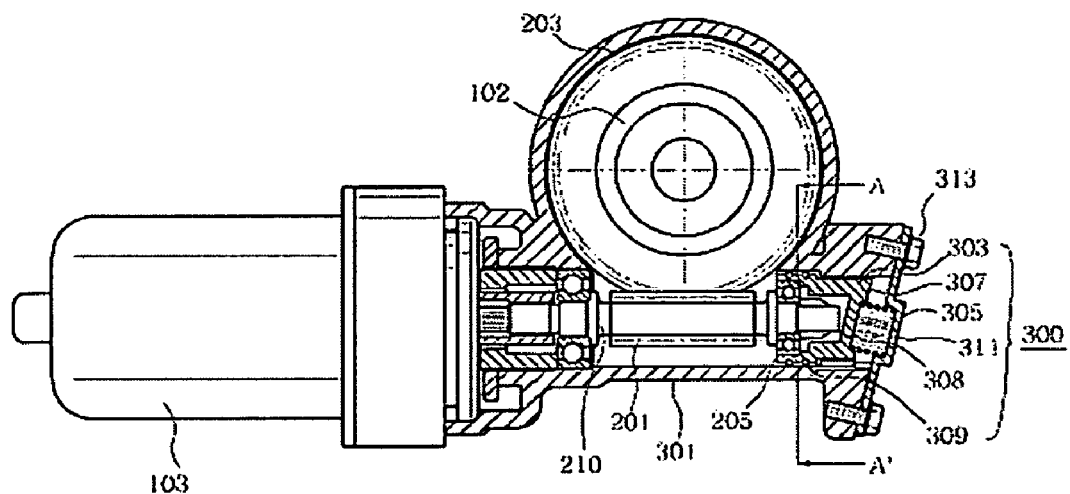
FIG. 3 is a partial sectional view showing a reduction mechanism of an electric power steering apparatus for an automobile according to a preferred embodiment of the present invention.

FIG. 3 is a partial sectional view showing a reduction mechanism of an electric power steering apparatus for an automobile according to a preferred embodiment of the present invention.

As shown in FIG. 3, a reduction mechanism of an electric power steering apparatus for an automobile according to a preferred embodiment of the present invention includes a motor 130 for generating steering power based on a control signal from an ECU; a worm wheel 203 formed on a steering wheel 102; a worm shaft 210 having a worm 201 formed on an outer peripheral surface thereof to engage with the worm wheel 203 and adapted to be rotated by the motor 103; and a gap compensation device 300 for compensating for the gap between the worm wheel 203 and the worm 201.

The motor 130, the driving of which is controlled by the ECU, rotates the worm shaft 210, which is connected to a motor shaft, and supplies the steering shaft 102 with steering power.

The worm wheel 203 is formed on one side of an outer peripheral surface of the steering shaft 102 and engages with the worm 201, which is formed on one side of an outer peripheral surface of the worm shaft 210. The rotational force of the worm shaft 210, which is caused by rotation of the motor 130, is transmitted to the steering shaft 102 via the worm 201 and the worm wheel 203. The worm wheel 203 is mainly made of a plastic material, but the material is not limited to that herein.

The worm shaft 210 is contained in a housing 301 and is connected to the motor shaft to be driven by the motor 130. The worm shaft 210 has a worm 201 formed on one side of an outer peripheral surface thereof to engage with the worm wheel 203 and rotate together with it, so that the rotational force is transmitted to the worm wheel 203. The worm shaft 210 has a bearing 205 on an end thereof to rotatably support the worm shaft 210.

The gap compensation device 300 includes a support member 303 and an elastic member 305.

The support member 303 receives the elastic force from the elastic member 305 and deflects the worm shaft 210 towards the worm wheel 203. The support member 303 encloses the bearing 205 and the worm shaft 210, while being spaced a predetermined distance from the bearing 205, and has a slanted surface 307 formed on one side thereof.

The support member 303 has a support groove 308 formed on one side of the slanted surface 307 so that an upper end of the elastic member 305 can be seated thereon. As a result, the elastic member 305 can apply elastic force to the support member 303 while making stable contact therewith.

The support member 303 is coupled to the worm shaft 210 in a press fit mode. The support member 303 is preferably made of a synthetic resin for easy press fit, but the material is not limited to that herein.

The support member 303 has an elastic ring 309 formed on one side of an outer peripheral surface thereof. The elastic ring 309 acts as a stopper between the outer peripheral surface of the support member 303 and an inner peripheral surface of the housing 301. In other words, the elastic ring 309 limits the axial movement of the worm shaft 210. The elastic ring 309 is made of an elastic material so that it does not generate impact sound when colliding with the inner peripheral surface of the housing 301.

Figure 4:
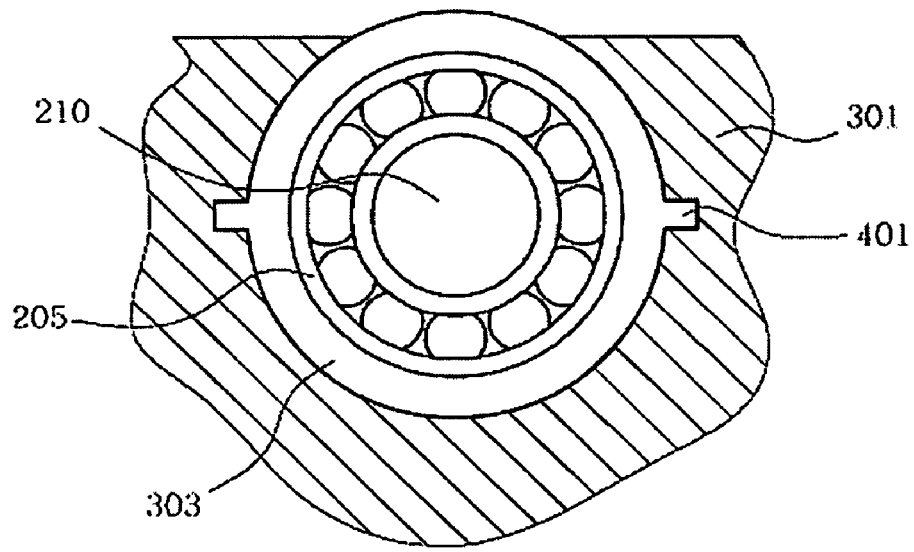
FIG. 4 is a sectional view taken along line A-A' of FIG. 3.

FIG. 4 is a sectional view taken along line A-A' of FIG. 3.

As shown in FIG. 4, the support member 303 has retaining guides 401 formed on the other side of the outer peripheral surface thereof in such a manner that they protrudes a predetermined length to be inserted into the housing 301.

The retaining guides 401 retain the support member 303 in the housing 301. This is because, if the support member 303 moves in the diametric direction (i.e. rotate about the worm shaft 210), the contact between the upper end of the elastic member 305 and the slanted surface 307 becomes irregular. As a result, the magnitude and direction of the elastic force fail to be uniform.

The elastic member 305 applies elastic force to the slanted surface 307 of the support member 303 and deflects the worm shaft 210 towards the worm wheel 203. An end of the elastic member 305 is in contact with the slanted surface 307 and the other end thereof is supported by a retaining plug 311, which is fixed to the housing 301 by a bolt 313.

The elastic member 305 is preferably a compression spring, but the type is not limited to that herein.

Figure 5:
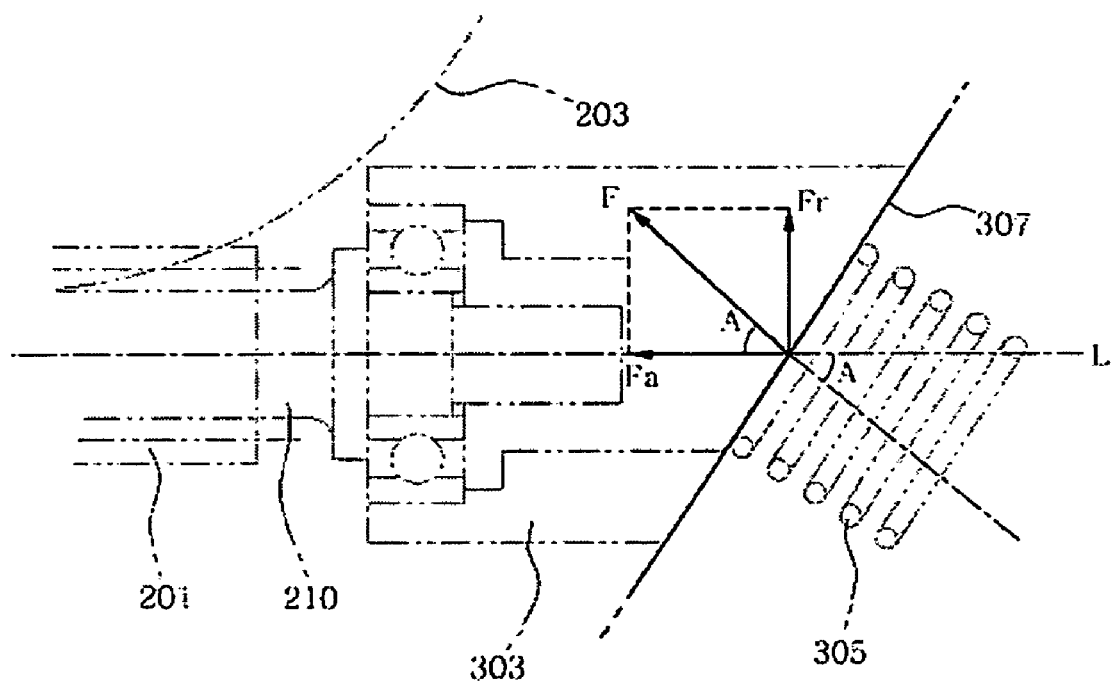
FIG. 5 briefly shows the application of elastic force from an elastic member to a support member.

FIG. 5 briefly shows the application of elastic force from the elastic member 305 to the support member 303.

As shown in FIG. 5, the elastic member 305 applies elastic force F in a direction perpendicular to the slanted surface 307. In terms of vector analysis, the elastic force F includes an axial component $F_a$ and a radial component $F_r$.

Supposing that the angle between the direction of application of the elastic force F and the central line L of the worm shaft 210 is A, the magnitude of the axial component $F_a$ is F×cos A and that of the radial component $F_r$ is F×sin A.

Particularly, when a compression spring having an elastic modulus of k is used as the elastic member 305 and the length of the compression spring, when compressed, is x, the magnitude of the elastic force from the compression spring is kx. Then, the magnitude of the axial component $F_a$ is kx×cos A and that of the radial component $F_r$ is kx×sin A.

Therefore, the compression spring is initially compressed to a predetermined length and is kept in contact with the support member 303 so that elastic force can be applied to the worm shaft 210, as defined above. This avoids creation of gap between the worm 201 and the worm wheel 203.

As mentioned above, the electric power steering apparatus for an automobile according to the present invention has a support member and an elastic member for simultaneously applying elastic force in the axial and radial directions of a worm shaft so that the gap between a worm wheel and the worm shaft is compensated for and backlash is avoided.

In addition, a single elastic member is used to apply elastic force to the worm shaft, in order to reduce the number of components, simplify the manufacturing process, and reduce the manufacturing cost.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An electric power steering apparatus for an automobile comprising:
    a steering shaft connected to a steering wheel of the automobile;
    a pinion shaft having an upper end connected to the steering shaft;
    a torque sensor for sensing torque generated by rotation of the steering shaft;
    an electronic control unit adapted to receive an electrical signal from the torque sensor;
    a motor, driving of the motor being controlled by the electronic control unit;
    a reduction mechanism having a worm shaft and a worm wheel, the worm shaft having a worm formed on an outer peripheral surface of the worm shaft, the worm shaft being contained in a housing, the worm wheel being formed on a side of the steering shaft, the reduction mechanism being driven by the motor;
    a support member for enclosing an axial end of the worm shaft; and
    an elastic member for applying elastic force to the support member in a direction slanted away from an axial direction of the worm shaft,
    wherein the elastic member is positioned at an angle relative to the axial direction of the worm shaft and is adapted to apply elastic force to the worm shaft in the axial direction of the worm shaft to deflect the worm shaft towards the worm wheel, and
    wherein the support member has a slanted surface formed on a side of the support member and has a support groove formed on the slanted surface, and an upper end of the elastic member is in the support groove.

2. The electric power steering apparatus for an automobile as claimed in claim 1, wherein the support member has retaining guides formed on an outer peripheral surface of the support member, the retaining guides protruding a predetermined length and being inserted into the housing.

3. The electric power steering apparatus for an automobile as claimed in claim 2, wherein the retaining guides are positioned so as to face each other in a diametric direction of the support member.

4. The electric power steering apparatus for an automobile as claimed in claim 3, wherein the support member has an elastic ring positioned on the outer peripheral surface.

5. The electric power steering apparatus for an automobile as claimed in claim 4, wherein the housing has a retaining plug formed on a side of the housing, and a lower end of the elastic member is supported by the retaining plug.

* * * * *